Patented Oct. 6, 1953

2,654,688

UNITED STATES PATENT OFFICE 2,654,688

MONOETHERS OF AN ARALIPHATIC GLYCOL AND THEIR USE IN THE CONTROL OF PESTS

Franz Haefliger, Basel, Switzerland, assignor to J. R. Geigy A. G., Basel, Switzerland, a Swiss firm No Drawing. Application September 7, 1951, Serial No. 245,653. In Switzerland May 8, 1951

4 Claims. (Cl. 167—30)

According to the present invention, new monoethers of 1.1-bis-(4'-chlorophenyl)-ethylene glycol are provided of the general formula:

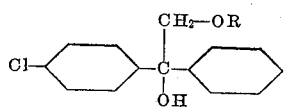

wherein R represents a member selected from the group consisting of alkyl and alkenylmethyl radicals, both containing a number of carbon atoms less than five. It has been found that compounds of this type have a very good acaricidal activity and are excellently suitable as active ingredients for the production of agents for combating pests and especially for controlling mites.

In admixture with dichlorodiphenyltrichloroethane, the new compounds enhance its effect, for example against flies resistant to pure dichlorodiphenyltrichloroethane.

The new compounds can be prepared by reacting an ester of an etherified hydroxyacetic acid of the general formula:

R—O—CH$_2$—COOH wherein R has the meaning given above, with two mols of a metal organic 4-chlorophenyl compound.

For example, the methyl or ethyl ester of an etherified hydroxyacetic acid as defined above can be reacted according to Grignard's method with 4-chlorophenyl magnesium bromide. Esters necessary for the reaction can be easily prepared, e. g. by reacting chloroacetic acid esters or bromoacetic acid esters with the appropriate sodium alkoxides. Methoxy, ethoxy, propoxy, butoxy and isobutoxy acetic acid esters are mentioned in Beilstein's Handbuch der org. Chemie, vol. III. Isopropoxy acetic acid esters and sec. butoxy acetic acid ethyl ester have been described in U. S. Patent No. 1,759,331. Allyloxy, methallyloxy, 2-butenyloxy and 3-butenyloxy acetic acid esters can be prepared in the same way or by esterification of the corresponding acids, some of which are described in U. S. Patent No. 2,406,590.

The following example illustrates the preparation of the new compounds.

Example 1

105 parts by weight of magnesium filings are completely covered with 500 parts by volume of abs. ether and dissolved with 805 parts of p-chlorobromobenzene. 264 parts of ethoxy acetic acid ethyl ester dissolved in 300 parts by volume of abs. ether are then added, while stirring, to the Grignard solution in such a manner that the ether is always kept boiling. On completion of this addition, the whole is boiled for a further 2 hours while stirring. After cooling, the reaction mixture is added to a concentrated ammonium chloride solution to which ice has been added and the whole is thoroughly stirred. When the layers have separated, the solution is filtered if necessary and the ether solution is drawn off whereupon it is washed with ammonium chloride solution, diluted caustic soda lye and water, after which it is dried. On distilling off the ether, 1.1-bis-(4'-chlorophenyl)-2-ethoxy ethanol remains as a thick oil which slowly crystallises. B. P. $_{0.05}$ 140–142° C. M. P. (from petroleum ether) 58.59° C.

The following compounds for example can also be prepared in an analogous manner by using the corresponding etherified hydroxyacetic acid esters:

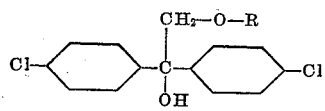

| R | B. P. | M. P., Degrees |
|---|---|---|
| —CH$_3$ | | 104–105 |
| —CH$_2$—CH$_2$—CH$_3$ | 160–162°/0.03 mm. | |
| —CH(CH$_3$)$_2$ | 152–154°/0.05 mm. | |
| —CH$_2$—CH$_2$—CH$_2$—CH$_3$ | 170°/0.04 mm. | 33 |
| —CH$_2$—CH=CH$_2$ | 140°/0.015 mm. | |
| —CH$_2$—(CH$_2$)$_4$—CH$_3$ | 130°/0.001 mm. | |
| —C$_6$H$_{11}$ | | |
| —CH$_2$—C$_6$H$_5$ | | |

The mode of application of the new compounds depends entirely on the intended use. The active compounds can be used in suitable liquid carriers or diluents, in the form of emulsions or dispersions, on favourable solid carriers, in ordinary or synthetic soaps, washing agents, dispersing agents etc. They can also be used together with other acaricidal, insecticidal, ovicidal, fungicidal, and/or bactericidal compounds or with inactive additives.

Concentrations of about 0.05–1% are sufficient for use in dilute liquid preparations to combat mites successfully; in dusting agents, concentrations of about 1–5% are sufficient. However, higher concentrations may be used in each case as the substances have no harmful effect on plants.

Different inert porous and pulverulent carriers of inorganic or organic nature come into consideration as solid carriers which are suitable for the preparation of pulverulent preparations, such as for example, tricalcium phosphate, calcium carbonate in the form of whiting or ground limestone, kaolin, bole, bentonite, talcum, powdered magnesia, kieselguhr, boric acid; also powdered cork, powdered wood and other fine powdery materials of a vegetable nature are suitable carriers. The active ingredients are mixed with the carrier, e. g., by grinding together; or the inert carrier can be impregnated with a solution of the active ingredients in a volatile solvent, after which the solvent is removed by heating or by suction under reduced pressure. By the addition of wetting and/or dispersion agents such pulverulent preparations can also become capable of being wetted with water, so that stable suspensions can be obtained, which can be used as sprays in plant protection.

Inert spray base carriers suitable for the production of liquid preparations should not be easily inflammable and should be as odourless and as non-toxic as possible to man and beast when used properly. They should also not change the active ingredients and not corrode the containers in which they are stored. As suitable spray base these carriers come into consideration: on the one hand oils with a high boiling point, e. g. of plant, animal or mineral origin such as castor oil, paraffin oil and so on; on the other hand lower boiling hydrocarbons with a flash point of at least 30° C. such as e. g. hydrated naphthalene, alkylated naphthalene, solvent naphtha, petroleum distillates of the kerosene type, etc. Naturally, a mixture of solvents can be used. The solutions are produced in the usual way, if desired with the aid of solubility promoters.

Other liquid forms of application are emulsions or suspensions of the active ingredients in water or other suitable inert solvents, or concentrates for the preparation of such emulsions which can be prepared directly at the site of operation by dilution to the desired concentration. For this purpose, the active ingredients are mixed with a dispersing or emulsifying agent. The active ingredients can also be dissolved or distributed in a suitable inert solvent and at the same time or later can be mixed with a dispersing or emulsifying agent. By dilution of such concentrates, e. g. with water, ready to use emulsions or suspensions are obtained. With suitable concentration and mixing proportions of the active ingredients, emulsifying agent and water, clear, completely stable watery solutions (emulsoids) are obtained.

Various capillary active substances with anion or cation active or non-ionogenic components may be used as dispersing or emulsifying agents. There may be enumerated, for example, natural or synthetic soaps, turkey red oil, fat alcohol sulphonates, sulphonated fats and fatty acid esters, etc., also higher molecular quaternary ammonium compounds, such as condensation products from aliphatic or aralipathic compounds and ethylene oxide, e. g. the condensation product from stearin alcohol and ethylene oxide.

The active ingredients can also consist of one or more compounds of the defined formula. They can also be combined for use with other acaricidal, insecticidal, ovicidal, fungicidal or bactericidal substances. Of these may be enumerated, for example, benzylbenzoate, dimethyl thianthrene, phthalonitrile, $\alpha,\alpha$-bis-(chlorophenyl)-$\beta,\beta,\beta$-trichlorethane, or -$\beta,\beta$-dichlorethane, 1.2.4.5.6.7.8.8-octachloro-3a.4.7.7a-tetrahydro-4.7-methano-indane, diethyl-p-nitrophenyl-thiophosphate, 5.5-dimethyl-dihydroresorcinol-dimethyl carbamate, dinitrocresol, nitrated naphthylamine, mercury compounds or inorganic substances such as copper compounds, sublimate, sulphur, etc. In this way, combined products with a wide range of activity are obtained.

Further, it is also possible to use the active ingredients in the form of aerosols. In this case the active ingredients are dissolved or dispersed in a solvent such as Freon, which boils under atmospheric pressure below room temperature, if desired with the aid of suitable inert diluents as liquid carrier. In this way, compressed solutions are obtained which in spraying will yield aerosols which are particularly suitable for combatting mites in closed rooms, greenhouses, grain silos and other storing places.

As further additives which can be mixed with the forms of application mentioned, there can be enumerated: adhesive substances such as casein, fatty acid salts, glue, resins, fats, albumen degradation products, wetting agents, solubility promoters, dyestuffs, attractives; with pulverulent preparations also dust binding agents, etc.

It is, therefore, possible by the choice of various extenders and additives to obtain a compound with dependent properties which make it suitable for a specially intended use. So, dips, sprinkling agents and spraying agents in the form of emulsions or suspensions and also emulsions and suspensions for general use and concentrates for their preparation can be prepared. The enumerated substances are mostly liquid preparations. Of solid preparations there can be mentioned: dusting agents, dry powder, strewing agents and also solid soap preparations which can be employed in the form of moulded pieces.

The agents for combatting mites can be used according to the usual methods of application. The mites or the object to be treated or to be protected against attack by mites, in particular plants, also for example, roots, root nodules, drugs, textiles, packing materials, grains, dried fruits, storing places for human and cattle foods, seeds, wood, leather, skins, paper, furs, hair, feathers, objects of all kinds, wall papers, walls, floors, can be treated with the active component or the described agents respectively, be it by dusting, strewing, sprinkling, painting, smearing, impregnating or by bringing them into or surrounding them by an atmosphere containing the active substances as smoke, steam or aerosol, or by other suitable methods.

Various modes of preparation of mite combatting agents and their use are described in the following examples. The parts are given throughout by weight.

*Example 2*

1–5 parts of 1.1-bis-(4'-chlorophenyl)-2-ethoxy ethanol are rubbed and ground with 99–95 parts of talc until the active substance in evenly distributed throughout the carrier. The dusting agent so prepared has a good action against the imagines and larvae of the red spider, e. g. *Paratetranychus pilosus*, *Tetranychus urticae*, etc. A similar action is obtained if a mixture of talc, kaolin and ground limestone is used as carrier.

*Example 3*

10 parts of 1.1-bis-(4'-chlorophenyl)-2-ethoxy ethanol are homogeneously ground with 80 parts of carrier and 10 parts of auxiliary substance. Kaolin, bentonite, etc. can be used as carriers and, for example, sulphite waste liquor, the sodium salt of dibutylnaphthalene sulphonic acid and also other wetting and adhesive agents can be used as the auxiliary substance. Such an agent suspended in water and used as a spray in concentrations of 0.1–1% has a good action against the imagines and larvae of the red spider.

*Example 4*

Suspendible spraying agents with an insecticidal and acaricidal action can be obtained by mixing 25–50 parts of dichlorodiphenyltrichlorethane with 5–10 parts of 1.1-bis-(4'-chlorophenyl)-2-methoxy ethanol and a porous, absorptive voluminous carrier, e. g. bentonite, kaolin, precipitated magnesium carbonate, etc. Sulphite waste liquor, blood albumin and the sodium salt of dibutylnaphthalene sulphonic acid in amounts of from 5–10 parts may be employed as additives. These spraying agents used in a concentration of 0.05–0.5% have a good activity against the imagines and larvae of the red spider and at the same time have an insecticidal action.

*Example 5*

10–25 parts of 1.1-bis-(4'-chlorophenyl)-2-ethoxy ethanol are mixed with 85–65 parts of a mixture of diacetone alcohol and xylene in a proportion of 1:2 and with 5–10 parts of an emulsifying agent. A high molecular ethylene condensation product, for example, may be used as emulsifying agent. This mixture is emulsifiable in water and, used in a concentration of 0.1–1%, has a good action on the imagines and larvae of the red spider.

The solvent can be replaced by 10–30 parts of mineral oil whereby a product with an increased acaricidal and ovicidal activity is obtained.

*Example 6*

0.1 part of 1.1-bis-(4'-chlorophenyl)-2-ethoxy ethanol is dissolved in 5–10 parts of mineral oil and 94.9–89.9 parts of petroleum (B. P. 180–220° C.), whereupon a spray with an acaricidal action is obtained.

*Example 7*

1 part of 1.1-bis-(4'-chlorophenyl)-2-methoxy ethanol is homogeneously ground with 5 parts of dichlorodiphenyltrichlorethane and 94 parts of talc. This mixture and also similar combinations with 5.5-dimethyl-dihydroresorcinol dimethyl carbamate, 1-phenyl-3-methyl-pyrazolyl-(5)-dimethyl carbamate and other contact insecticides or also with inorganic and organic fungicides are excellently suited for the control of red spiders and other pests and fungi diseases.

*Example 8*

20–25 parts of dichlorodiphenyltrichlorethane and 4–6 parts of 1.1-bis-(4'-chlorophenyl)-2-ethoxy ethanol are dissolved in a mixture of 71–59 parts of diacetone alcohol and xylene in a proportion of 1:2 and the whole is mixed with 5–10 parts of an emulsifying agent of the ethylene condensation product type. This solution is emulsifiable and used in a concentration of 0.3–0.5% has a good action on red spiders and at the same time it has an excellent insecticidal activity.

What I claim is:

1. As new chemical compounds, monoethers of an araliphatic glycol of the general formula:

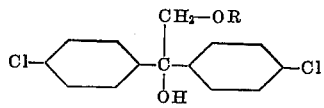

wherein R represents a member selected from the group consisting of alkyl radicals, containing a number of carbon atoms less than five, and the allyl radical.

2. As a new chemical compound 1.1-bis-(4'-chlorophenyl)-2-methoxy ethanol.

3. As a new chemical compound, 1.1-bis-(4'-chlorophenyl)-2-ethoxy ethanol.

4. An acaricide comprising a monoether of an araliphatic glycol of the general formula:

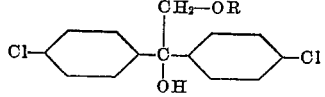

wherein R represents a member selected from the group consisting of alkyl radicals, containing a number of carbon atoms less than five, and the allyl radical, and a carrier therefor.

FRANZ HAEFLIGER.

References Cited in the file of this patent

UNITED STATES PATENTS

| Number | Name | Date |
|---|---|---|
| 2,430,586 | Ruthruff | Nov. 11, 1947 |